United States Patent [19]

Perkins

[11] Patent Number: 5,145,204
[45] Date of Patent: Sep. 8, 1992

[54] STAMPED WHEEL SUPPORT BRACKET FOR VEHICLE SUSPENSION

[75] Inventor: David J. Perkins, Ann Arbor, Mich.

[73] Assignee: Chrysler Corporation, Highland Park, Mich.

[21] Appl. No.: 813,640

[22] Filed: Dec. 26, 1991

[51] Int. Cl.⁵ .............. B60G 15/00; B60G 15/12; B62D 7/06
[52] U.S. Cl. ................ 280/668; 188/321.11; 267/221; 280/96.1; 280/673; 280/696; 280/701; 280/791
[58] Field of Search ............ 267/221, 219, 248, 286, 267/33, 34, 35, 153, 67; 188/321.11, 322.19; 280/668, 661, 666, 696, 663, 691, 793, 791, 701, 670, 674, 673, 725, 724, 96.1

[56] References Cited

U.S. PATENT DOCUMENTS

| | | | |
|---|---|---|---|
| 4,274,654 | 6/1981 | Travaglio | 280/668 |
| 4,321,988 | 3/1982 | Bich | 280/668 X |
| 4,418,938 | 12/1983 | Sullivan et al. | 280/668 X |
| 4,441,593 | 4/1984 | Axthammer | 280/668 X |
| 4,491,340 | 1/1985 | Von Grunberg et al. | 280/668 |
| 4,542,920 | 9/1985 | Kijima et al. | 280/701 |
| 4,545,601 | 10/1985 | Muller et al. | 280/668 |
| 4,650,211 | 3/1987 | Tanahashi | 280/725 X |
| 4,674,760 | 6/1987 | Goulart | 280/96.1 X |
| 4,761,019 | 8/1988 | Dubensky | 280/674 |
| 4,807,901 | 2/1989 | Kondo | 280/701 |
| 4,840,396 | 6/1989 | Kubo | 280/701 X |
| 4,948,160 | 8/1990 | Barry | 280/668 X |
| 4,973,075 | 11/1990 | Rori et al. | 280/661 |
| 4,989,894 | 2/1991 | Winsor et al. | 280/701 X |
| 5,071,156 | 12/1991 | Kanai et al. | 280/668 X |
| 5,080,388 | 1/1992 | Berry et al. | 280/661 |

FOREIGN PATENT DOCUMENTS

| | | | |
|---|---|---|---|
| 0083669 | 7/1983 | European Pat. Off. | 280/668 |
| 3246065 | 7/1983 | Fed. Rep. of Germany | 280/668 |
| 3932329 | 4/1990 | Fed. Rep. of Germany | 280/668 |

Primary Examiner—Douglas C. Butler
Attorney, Agent, or Firm—Edward P. Barthel

[57] ABSTRACT

A light weight knuckle bracket for supporting a wheel hub and longitudinal and lateral control arms on a shock absorber strut of a vehicle rear suspension system. The bracket is formed from a pair of forward and aft mirror image body units stamped from sheet metal integrated with each other by mutually facing outboard and inboard planar portions welded together. Each body unit is formed with a semi-cylindrical socket portion intermediate the outboard and inboard planar portions. The mutually facing socket portions define a cylindrical pathway snugly enveloping and connecting a tubular member of the strut to the bracket providing a combined rigid structure.

5 Claims, 3 Drawing Sheets

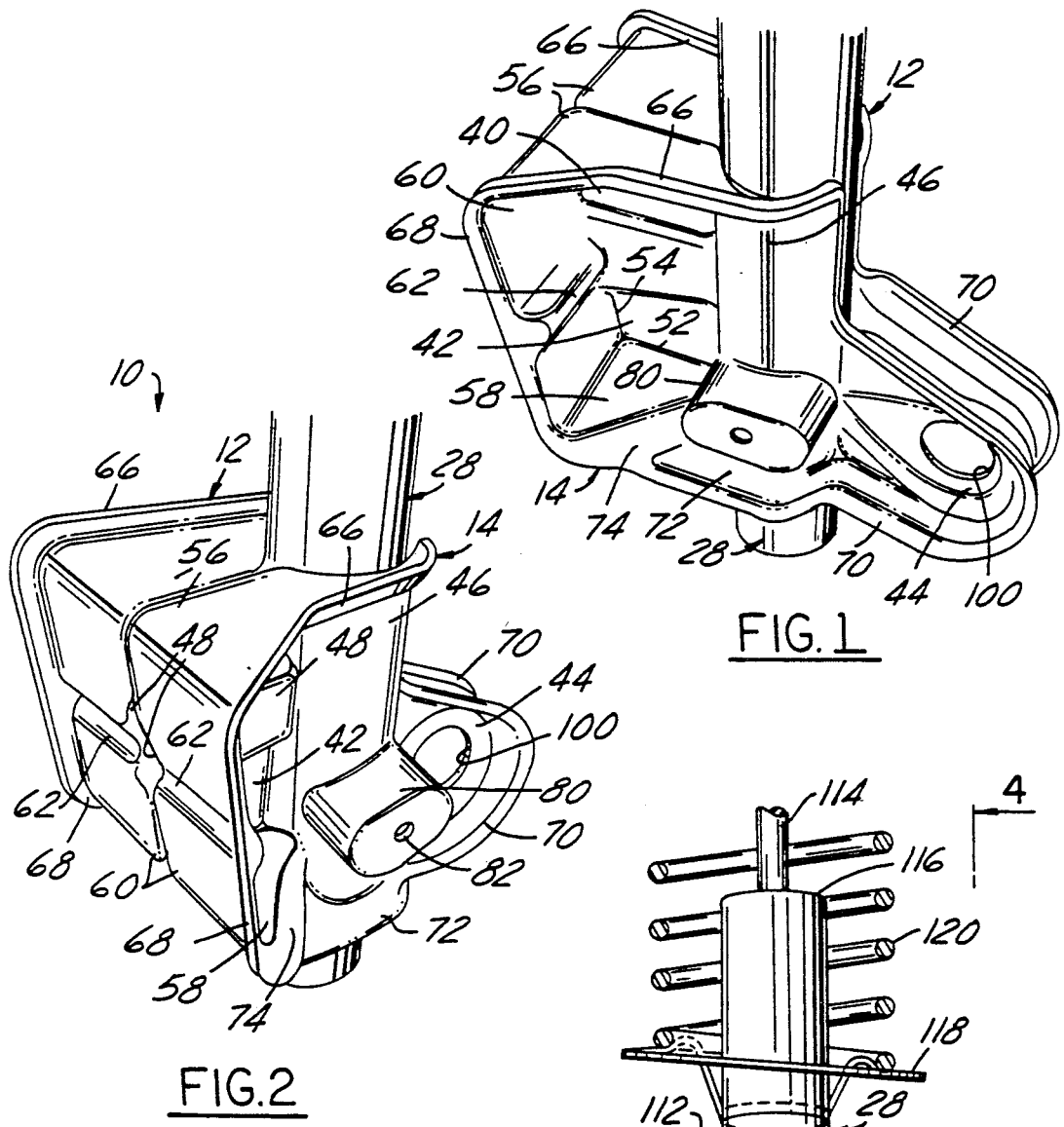
FIG. 1
FIG. 2
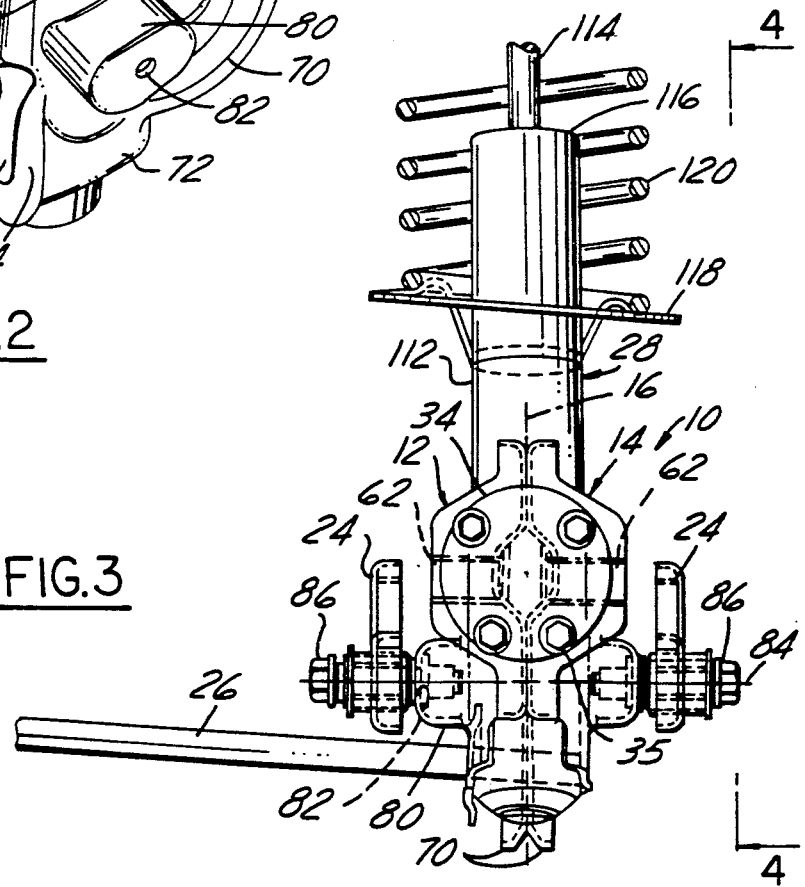
FIG. 3

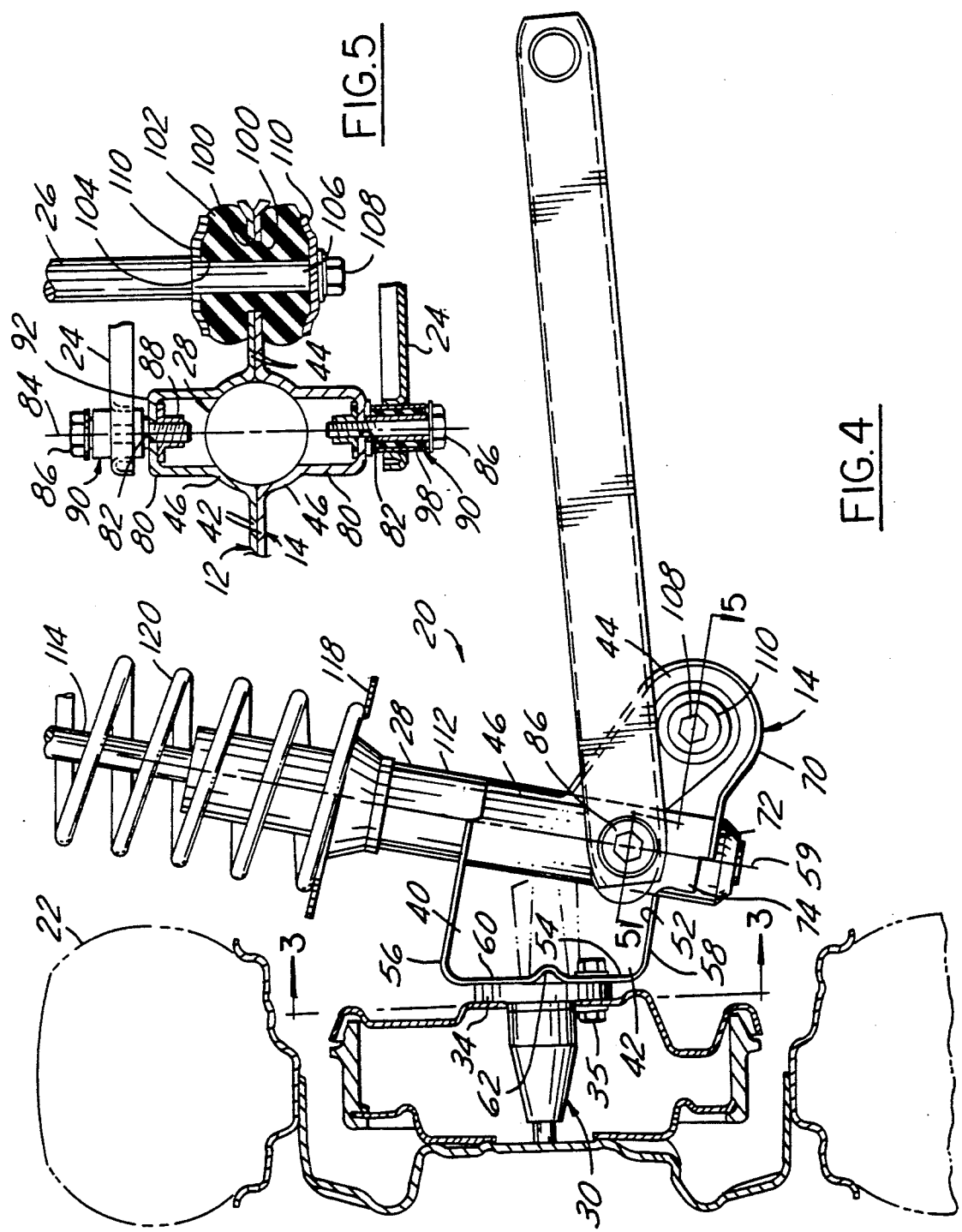

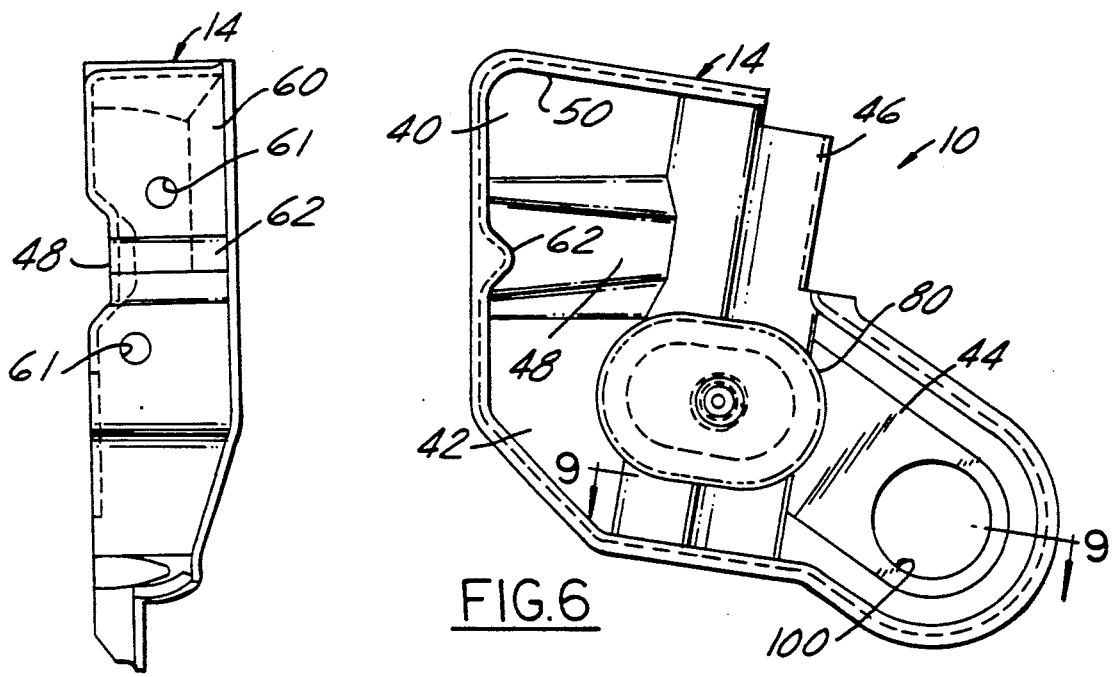
FIG.8  FIG.6
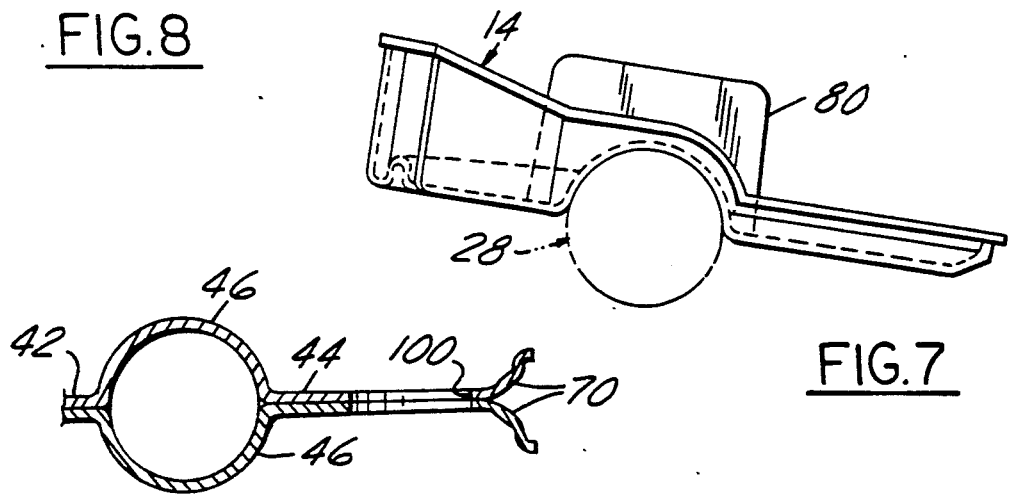
FIG.7
FIG.9

STAMPED WHEEL SUPPORT BRACKET FOR VEHICLE SUSPENSION

BACKGROUND OF THE INVENTION

This invention relates to the construction of wheel support brackets for automotive vehicles and more particularly to a wheel support bracket formed from a pair of integrated mirror image stampings for a strut type suspension system.

It well known in the automotive industry to form a wheel support bracket or knuckle for vehicle suspension systems from cast or forged metal. A disadvantage of such cast or forged support brackets is the increased mass such parts add to the vehicle unsprung weight.

The U.S. Pat. No. 4,491,339 issued Jan. 1, 1985 to Mizumukai et al. discloses a two piece knuckle bracket for a automobile suspension strut made of sheet metal having low manufacturing costs and a light weight.

The U.S. Pat. No. 4,545,601 issued Oct. 8, 1985 to Muller et al. discloses a stamped strut and spindle support for an independent wheel suspension system. A two-piece stamped support structure is shown having a spindle support member and a strut support member with the two members arranged as a unitary assembly in abutting relationship in the lower portion of the assembly. The assembly defines a conventional mounting base of locally doubled thickness for the wheel providing a cavity through which a drive unit such as a front wheel drive half shaft assembly may be operatively connected to the wheel.

SUMMARY OF THE INVENTION

It is an object of the present invention to provide a light weight composite wheel support bracket for a vehicle strut type suspension system which is economically formed from a pair of body units stamped from sheet metal.

It is another object of the present invention to provide a light weight composite wheel support bracket as set forth above composed of fore and aft halved mirror image body units stamped from sheet metal and integrated with each other by mutually facing planar portions disposed flatwise defining a plane of symmetry for the bracket which plane extends transversely to the plane of the wheel.

It is still another feature of the present invention to provide a light weight composite wheel support bracket as set forth above wherein each body unit is formed with a semicylindrical socket portion of predetermined size intermediate outboard and inboard planar portions. Thus, one unit strut socket portion initially envelops one half of a suspension strut cylindrical tubular member and is welded thereto. Thereafter the remaining unit semi-cylindrical socket portion envelopes the remaining one half of the strut tubular member and is welded thereto forming a cylindrical sleeve-like pathway surrounding the tubular member. As a consequence the strut tubular member is structurally integrated into the wheel support bracket upon the associated inboard and outboard planar portions of each body unit being welded in a flatwise manner to provide a combined rigid structure.

BRIEF DESCRIPTION OF THE DRAWINGS

These and other objects, features and advantages of the invention will appear from the following written description and the accompanying drawings in which:

FIG. 1 is a fragmentary perspective view of a wheel support bracket in accordance with the present invention;

FIG. 2 is a fragmentary perspective view similar to FIG. 1;

FIG. 3 is a fragmentary side view, partly in section, taken on the line 3—3 of FIG. 4;

FIG. 4 is a fragmentary rear elevational view, partly in section, of a vehicle suspension system according to the present invention for a left hand rear wheel as viewed from the rear of the vehicle looking forward;

FIG. 5 is a fragmentary generally horizontal sectional view taken on the line 5—5 of FIG. 4;

FIG. 6 is an enlarged detail side elevational view of the wheel support bracket aft half body unit of the present invention;

FIG. 7 is a bottom elevation view of the aft body unit of FIG. 6;

FIG. 8 is a side elevational view of the aft half body unit of FIG. 6; and

FIG. 9 is a fragmentary cross sectional view taken on the line 9—9 of FIG. 6.

DETAILED DESCRIPTION OF THE INVENTION

Referring now to the drawings and in particular to FIGS. 1 and 2 there is shown at 10 perspective views of a composite wheel support bracket formed from a pair of fore 12 and aft 14 mirror image half body units stamped from sheet metal. The units 12 and 14 are joined or integrated with each other by a plurality of planar portions mating in a flatwise manner defining a vertically disposed transversely extending plane of symmetry which includes the dashed construction line shown at 16 in FIG. 3.

With reference now to FIGS. 4 and 5 a suspension system, generally indicated at 20, is shown supporting a rear wheel 22 together with a pair of lateral control links 24, a longitudinal trailing arm 26, and a MacPherson type suspension shock absorber strut 28 operative for use on a passenger automobile vehicle. The rear wheel has a conventional hub (not shown) rotatably mounted on a wheel spindle member 30 fixed to the wheel support composite bracket 10. The composite bracket 10 and the spindle member 30 are arranged in abutting arrangement and define a conventional mounting base for the wheel 22. The composite bracket establish a vertically disposed longitudinally extending outboard composite spindle panel mounting surface "S" positioned for flush flatwise abutment with opposed base flange 34 of the spindle member 30. Suitable spindle attaching bolts, shown at 35 in FIG. 3 and 4, are provided to secure the base flange 34 to the bracket 10.

With reference to FIGS. 1, 2 and 6 as the bracket stamped fore 12 and aft 14 halved units are formed in identical mirror image fashion like or corresponding portions will be given the same reference number. Thus, as seen in FIG. 6, the aft unit 14 comprises a pair of upper 40 and lower 42 outboard planar portions and an inboard central planar portion 44. The outboard planar portions 40 and 42 are separated from the inboard planar portion 44 by a vertically disposed semi-circular strut pathway portion 46. It will be noted that the upper 40 and lower 42 planar portions are in turn separated by a horizontally extending channel-sectioned stiffening rib portion 48.

Each bracket unit pair of outboard planar portions 40 and 42 are defined by upper 50 and lower 52 vertically opposed parallel edges, an outboard vertically disposed edge 54 and its strut pathway portion 46. Each bracket unit 12 and 14 also has upper 56 and lower 58 tread flanges defining parallel planes, normally disposed relative to the principal axis 59 of the strut 28, at each bracket upper 50 and lower 52 edge and extending substantially normal to their respective upper 40 and lower 42 outboard planar portions. Each bracket unit 12 and 14 provides a mounting flange portion 60 at its respective outboard edges 54 establishing a composite mounting flange provided with a plurality of holes 61 (FIG. 8) for receiving an associated attaching bolts 35. The flange portions 60 extend normal to their associated upper 40 and lower 42 planar portions thereby defining a vertically disposed longitudinally extending plane providing the panel mounting surface "S". As seen in FIG. 2 each fore and aft mounting flange portion 60 is divided by a longitudinally extending V-sectioned stiffening rib 62 with each rib 62 having its opposed one end intersecting its associated channel-sectioned stiffening rib 48 at vertically disposed edge 54. It will be noted that each of the upper tread flanges 56 and each of the mounting flange portions 60 are bordered by rolled stiffening lips 66 and 68, respectively.

With reference to FIGS. 1 and 2 each bracket unit inboard planar portion 44 is defined by a radiused lobe-shaped bordering rolled stiffening lip 70. As best seen in FIG. 6, the lower portion of each bordering rolled lip 70 blends into an associated lower flanged collar portion 72 defining the lower extent of each strut semi-circular pathway portion 46. It will be noted in FIGS. 1, 2 and 4 that each riser portion 74 terminates at a right angle juncture with its associated lower tread portion 58.

FIGS. 1-3 disclose each strut pathway portion 46 formed with a longitudinally extending boss portion 80. As best seen in FIG. 5 each of the boss portions 80 have mounting holes 82 aligned on a common longitudinal axis 84 with each hole receiving a pivot bolt 86 aligned on the axis 84. FIG. 5 shows each of the blots 86 is threadably received in an associated sleeve nut 88 welded to the inner surface of its boss 80. Each of the pivot bolts 86 supports a resilient bushing assembly 90 that extends between each bolt head undersurface and its associated boss end wall 92. Each bushing 90 includes a rubber cylinder 94 surrounded by an inner metal sleeve 96 and an outer metal sleeve 98.

The outboard end of each of the control links 24 has an aperture fixedly receiving an associated bushing outer sleeve 98 therethrough so as to be anchored thereto allowing limited pivotal movement of the links 24 about the common axis 84 of their respective bolts 86. The opposite ends of the pair of suspension control links 24 are pivotally connected at an aperture 99 to the vehicle body chassis by a suitable bracket structure (not shown). The control link apertures 99 may be coaxial or the links 24 may be different lengths.

With reference to FIG. 5 the bracket unit inboard planar portions 44 have aligned circular apertures 100 receiving therethrough an elastomeric or rubber double doughnut shaped member 102 The elastomeric member comprises forward and aft doughnut portions disposed on the outer face of either planar portion interconnected by a reduced diameter intermediate portion which extends through the aligned apertures 100. The rubber member 102 is formed with a central longitudinal bore 104 receiving therethrough one reduced end 106 of the trailing arm 26. A bolt 108 is threaded into an internally threaded axial bore formed in the free end of the longitudinal arm 26. Upon the bolt 108 being tightened it compresses a pair of opposed retaining washer like clamps 110 on either end of the rubber member. The clamps 110 sandwich the rubber member 102 therebetween allowing limited resilient movement of the longitudinal arm 26 relative to the composite bracket 10.

As seen in FIG. 5 upon the bracket fore and aft body half units 12 and 14, respectively, outboard and inboard planar portions being joined along the transverse plane of symmetry as by, for example, spot or projection welding. As seen in FIG. 9 the mating semi-circular strut pathway portions 46 are adapted to define a cylindrical composite pathway. Each of the pathway portions are sized to receive, in a sandwich-like manner, the cylindrical reservoir tube 112 of the suspension strut 28. The interior surface of the pathway portions 46 are suitably affixed to the exterior surface of the tube 112 as by spot or projection welding.

Piston rod 114, which extends axially and upwardly through end cap 116 of the tube 112, has its upper end attached to suitable strut mounting assemblies (not shown) fixed to a vehicle sheet metal tower or the like (not shown). A spring seat 118 centrally secured to the tube 112 is shown supporting the lower end of a helical suspension spring 120 in a conventional manner. Reference may be made to the U.S. Pat. No. 4,804,169 issued Feb. 14, 1989 to Hassen for details of atypical strut piston rod connection. The Hassen patent is incorporated by reference herein.

While the principles of the present invention in connection with the specific test device has been described, it is to be understood the foregoing detailed description has been made by way of example only and not as a limitation to the scope of the invention as set for in the accompanying claims.

What is claimed is:

1. An independent suspension system for a vehicle body rear wheel wherein a resiliently telescoping strut assembly, having a cylindrical tubular member defining a principal axis, is interposed between a wheel spindle and a portion of the vehicle body at the wheel, a longitudinally extending arm member pivotally mounted to the vehicle body forwardly of the wheel and a pair of laterally extending control link members pivotally mounted to the vehicle body inboard of the wheel, a composite wheel support bracket for supporting the arm member, the pair of control link members, and the strut assembly for the wheel comprising:

a light weight two-piece bracket being made of sheet metal stock and being composed of forward and aft stamped half body units which units are mirror images of each other, said units connected together at mutually facing outboard and inboard planar portions secured in flatwise abutment whereby said planar portions defining a plane of symmetry of said bracket;

each said unit outboard and inboard planar portion separated by a semi-cylindrical pathway portion, said pathway portions in mutually facing relation defining a cylindrical pathway snugly enveloping and connecting the tubular member therein such that said tubular member principal axis is aligned with a principal axis of said cylindrical pathway and inclined inboard from a vertical plane of the wheel at a slight acute angle;

each said unit outboard planar area having a rigid open box structure defined by opposed upper and lower tread flanges, an outboard mounting edge flange portion and its associated pathway portion; and each said unit outboard mounting flange portion disposed in a common longitudinally extending vertically disposed plane providing a composite bracket mounting flange whereby a portion of the spindle is in flatwise abutment with said composite mounting flange.

2. The composite wheel support bracket as set forth in claim 1 wherein each said inboard planar portion is stiffened by a lobe shaped bordering flange extending normal to said plane of symmetry, each said inboard planar portion formed with a circular aperture aligned on a common longitudinal axis providing a composite arm member support, a double-doughnut shaped elastomeric member supported in each said circular aperture such that forward and aft doughnut portions of said elastomeric member are disposed on either inboard planar portion of said composite arm member support interconnected by a reduced diameter intermediate portion extending through each said circular aperture, whereby the longitudinal arm member having one end thereof extending through a central bore in said elastomer member and affixed thereto enabling limited pivotal movement of the arm member relative to the vehicle body.

3. The composite wheel support bracket as set forth in claim 1 wherein said pathway portions formed with mutually opposite longitudinally extending integral bosses each having a control link member hole aligned on a common longitudinally extending pivot axis, a pivot bolt extending through each said control link member hole supporting a resilient bushing thereon, each said resilient bushing having an outer sleeve fixedly secured to an outboard end of one of the control link members enabling limited pivotal movement of each of the control link members relative to the vehicle body.

4. The composite wheel support bracket as set forth in claim 1 wherein said mutually facing outboard and inboard planar portions are welded together and said pathway portions are each welded to the tubular member.

5. The composite wheel support bracket as set forth in claim 1 wherein each said pathway portion having its lower end terminating in a flanged collar located in a plane which intersects said cylindrical pathway principal axis at right angles.

* * * * *